April 20, 1954

K. R. WEBER 2,675,751

TRACTOR MOUNTED IMPLEMENT

Filed Oct. 3, 1951

Inventor
Kenneth R. Weber
by Kimball A. Wyman
Attorneys

April 20, 1954 K. R. WEBER 2,675,751
TRACTOR MOUNTED IMPLEMENT
Filed Oct. 3, 1951 3 Sheets-Sheet 2

Inventor
Kenneth R. Weber
by Kimball␣S.␣Wyman
Attorneys

April 20, 1954   K. R. WEBER   2,675,751
TRACTOR MOUNTED IMPLEMENT
Filed Oct. 3, 1951   3 Sheets-Sheet 3

Inventor
Kenneth R. Weber
Kimball A. Wyman
by
Attorney

Patented Apr. 20, 1954

2,675,751

UNITED STATES PATENT OFFICE 2,675,751

TRACTOR MOUNTED IMPLEMENT

Kenneth R. Weber, La Crosse, Wis., assignor to Allis-Chalmers Manufacturing Company, Milwaukee, Wis.

Application October 3, 1951, Serial No. 249,470

9 Claims. (Cl. 97—46.07)

This invention relates generally to tractor mounted agricultural implements and is more particularly concerned with the provision of an improved construction designed to provide a simplified arrangement affording material advantages as to ease in mounting and operation of such implements.

More particularly, the present invention has as an object the provision of an implement incorporating improved features of construction and attachment permitting the implement to be selectively readily mounted on a tractor in either forward or rearward relation with respect to the traction wheels thereof.

Another object of this invention is the provision of an implement which is readily combinable with a tractor as aforesaid by means of an improved construction and coaction of parts affording effective automatic draft regulation when mounted in either position.

Still another object of the present invention is the provision of a tractor mounted implement wherein parts are constructed and combined for coaction in an improved manner minimizing costs and the effort and skill required for attaching and detaching the implement as desired.

Accordingly, the invention may be considered as comprising features of construction and combination designed to obtain one or more of the aforementioned objects and to afford numerous advantages as hereinafter more fully set forth in the following detailed description and appended claims, reference being had to the accompanying drawings, wherein:

Figure 1:
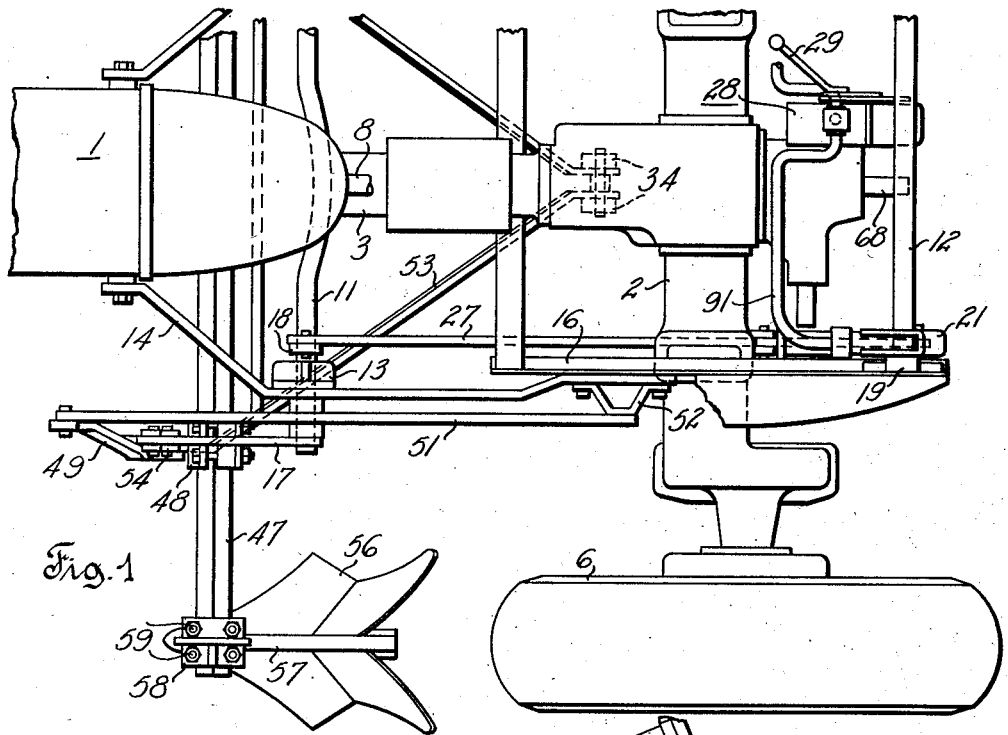
Fig. 1 is a partial plan view of a tractor implement combination embodying the invention.
Figure 2:
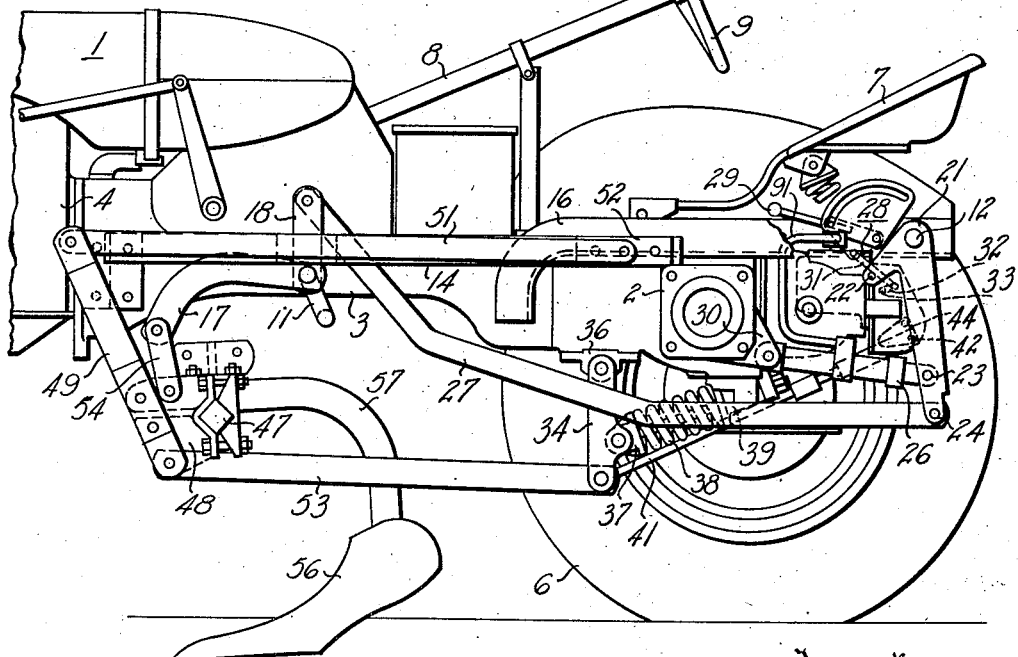
Fig. 2 is a side elevation of the tractor and implement shown in Fig. 1 with the near side traction wheel and ground working tool removed in the interest of clarity.

Referring to Figs. 1 and 2, it will be seen that the implement is attached to a conventional tractor 1 comprising a rear drop axle structure 2, and a torque tube 3 rigidly uniting a midportion of axle structure 2 with the rear portion of a conventional power unit 4. The forward end of the power unit is supported in the usual manner on a dirigible front wheel structure which has been omitted in the interest of simplicity as it forms no part of the present invention. The rear axle structure is supported on a pair of ground engaging traction wheels 6 and an operator's station or seat 7 is disposed in superposed relation with respect to a midportion of axle structure 2. The tractor is provided with a conventional means for steerably controlling the dirigible front wheel support (not shown), such means comprising a steering column 8 which extends upward and rearward, in generally overlying relation to the torque tube, and terminates in a wheel portion 9 disposed within easy reach of the operator's seat. In this connection it will be understood that the tractor is additionally provided with the usual power unit and transmission controls which are not shown as they have no particular bearing on an understanding of the present invention.

The tractor is also provided with a lift mechanism comprising a pair of rock shafts 11 and 12 disposed respectively in front and to the rear of axle structure 2. Front rock shaft 11 is rotatably supported in bearings 13 disposed at opposite sides of the tractor and operatively mounted in similar elongated support members 14 having their forward ends fixedly attached to opposite rear side portions of power unit 4 and having their rear ends fixedly secured to the rear fender bracket 16. In this connection it will be understood that rock shaft 11 extends transversely of the tractor and is provided with a supporting means on the far side thereof (not shown) which is identical to that just described as mounted on the near side of the tractor. The outer ends of rock shaft 11 are provided with a forwardly and downwardly extending lifting arm 17 which is fixedly attached thereto outwardly of bearing 13. In addition, this rock shaft is provided with an upstanding actuating arm 18 which is disposed inwardly of bearing 13 and designed for connection with a suitable power source as hereinafter described.

Rear rock shaft 12 is mounted in transversely aligned bearings 19 and is provided with a pair of laterally aligned crank members 21 which are movable therewith. Each crank member 21 is in the nature of a bell crank lever provided with ram attaching pivot pin receiving holes 22 and 23 of which hole 22 is disposed in the free end of the actuating arm or short arm and hole 23 in an intermediate portion of the lift arm or long arm The free end of the long arm is further provided with another pivot pin receiving hole 24.

Power for actuating the front and rear rock shafts is obtained from a power transmitting device or servomotor, such as a hydraulic ram 26 having its cylinder end pivotally connected to a depending bracket 30 carried by axle structure 2 for vertical swinging movement relative thereto. The piston rod or power output element of the ram is selectively pivotally connectable with either the short or long arm portions of crank member 21 by means of the holes 22 and 23, as desired. In the combination shown in Figs. 1 and 2 the piston rod end of the ram is pivotally connected at opening 23 with the long arm portion of crank member 21, and the hole 24 in the outer extremity thereof receives a pivot pin connecting the rear end of a fore and aft extending link 27 therewith. The forward end of link 27 is pivotally connected with the outer end of actuating arm 18 on front lift shaft 11.

The operation of ram 26 is selectively controlled by means of a combined pump and hydraulic control unit 28 including a manually positionable lever 29 having a link connection 31 with an arm 32 fixed on a control shaft 33 rotatably mounted in the combined unit. The underside of axle structure 2 is provided with a depending control member or lever 34 mounted for fore and aft swinging movement on a bracket 36 fixedly secured to the underside of the forwardly extending central portion of the axle structure. An intermediate portion of lever 34 is provided with a pivot support 37 forming a spring seat against which bears one end of a compression spring 38, the other end of this spring bearing against a fixed seat provided by a bracket 39 secured to the underside of the tractor in rearward longitudinally aligned relation with respect to lever 34. A link 41 has one end suitably connected to a lower end portion of lever 34 and has its opposite end operatively connected by means of a pin 42 and a slot 43 with an arm 44 attached to the projecting end of a control shaft 46 rotatably mounted in the housing enclosing the pump and control unit 28 (note Fig. 4).

The implement comprises a continuous transverse tool bar 47 to which is attached laterally spaced supporting brackets 48 disposed in underlying generally vertically aligned relation with respect to the forward end of the lift arm 17 on rock shaft 11. A forwardly and upwardly extending strap element 49 (one for each bracket) has its lower end fixedly secured to bracket 48 and has its upper end pivotally connected with the forward end of a lever 51 which extends fore and aft of the tractor and has its rear end pivotally mounted on a bracket 52 fixedly secured to the rear portion of bearing support member 14. An A-frame type structure or reach member 53 has its apex pivotally secured to the lower end of depending lever 34 and has its laterally spaced forward ends pivotally connected to brackets 48 at points generally in line with the lower portion of strap element 49. The forward end of each lift arm 17 is pivotally operatively connected with an underlying portion of the associated bracket 48 by means of a vertically interposed link 54. In this connection, it will be noted that link 54 and the pivotal connection with the forward end of A-frame structure 53 are, for all practical purposes, disposed in a common vertical plane extending longitudinally of the tractor. A ground working tool 56, in this case a lister, is provided with an upward and forward extending rigid beam 57 having its front end fixedly adjustably attached to tool bar 47, outwardly of bracket 48, by means of a clamp element 58 and U-bolts 59. Usually the lister bottoms, one on each side of the tractor, are spaced equal distances from the opposite sides of centerline of the tractor to provide a laterally balanced draft effect.

Figure 4:
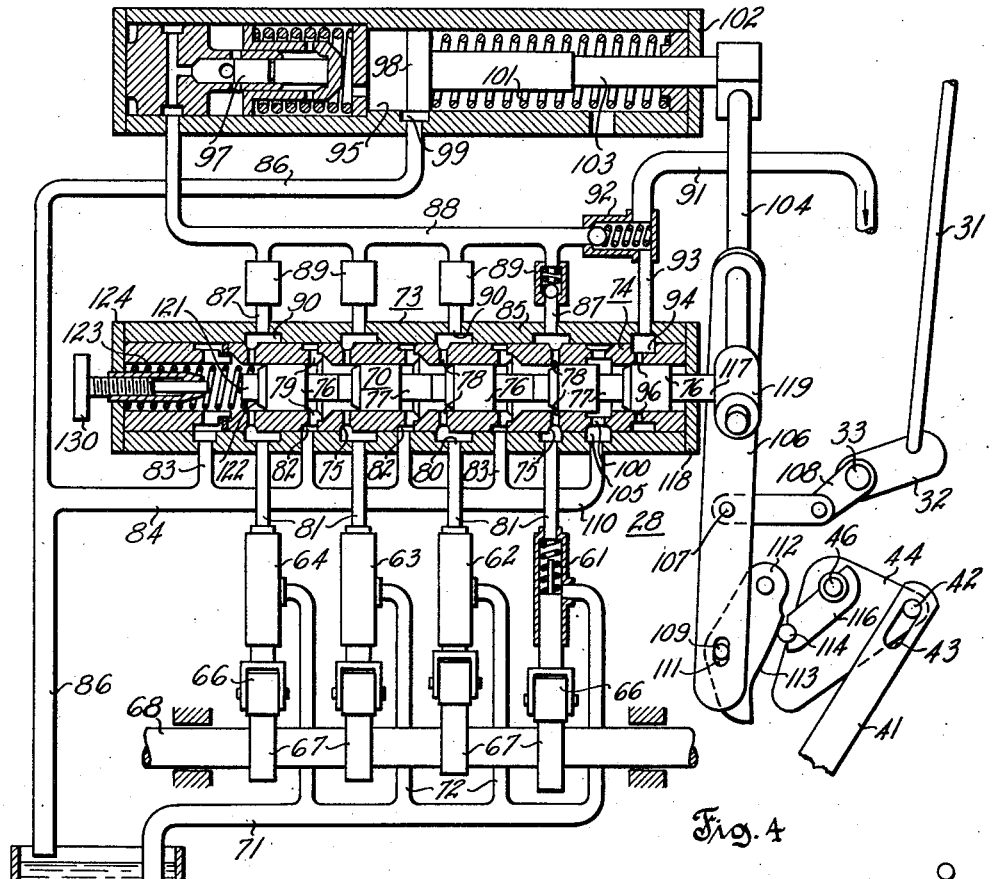
Fig. 4 is a diagrammatic illustration partly in section of the hydraulic control mechanism.
Figure 3:
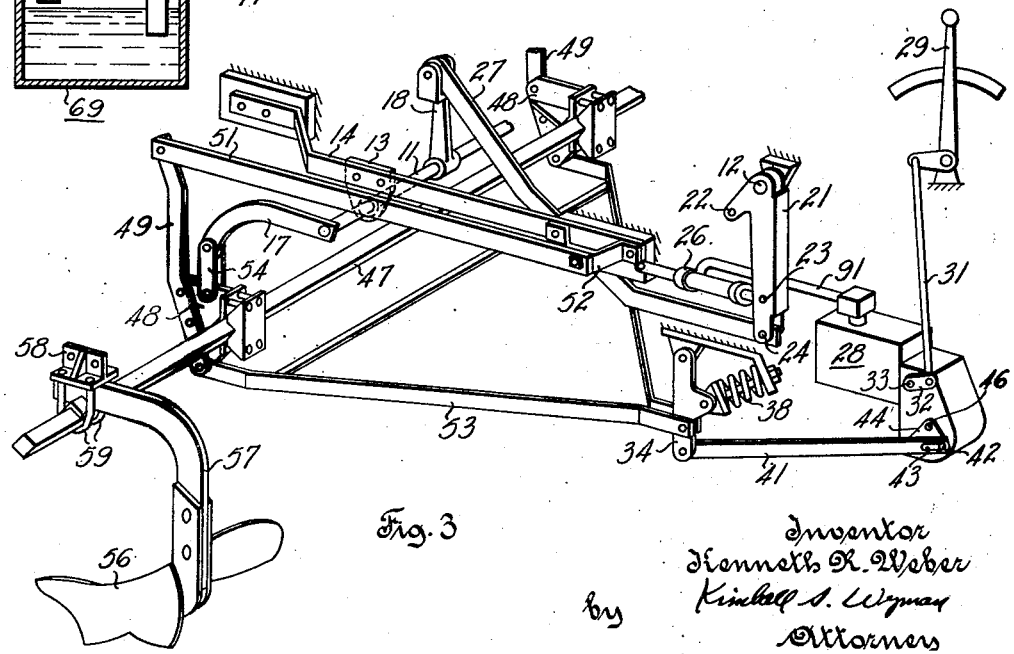
Fig. 3 is a perspective schematic illustration of the implement structure and mounting shown in Figs. 1 and 2.

Referring to Fig. 4, it will be observed that the pump and control unit 28 comprises a housing of the shape diagrammatically outlined in Fig. 3, which detachably covers an opening in axle structure 2 and encloses a plurality of plunger type pumps, there being four pumps 61, 62, 63 and 64 reciprocated by means of cam followers or rollers 66 engaging similar cam surfaces 67 formed on a shaft 68 disposed in axle structure 2. Each pump is connected with a source of fluid 69 by means of a common conduit 71 and by means of branch conduits 72. The discharge ends of these pumps are connected with a valve structure 73 comprising a housing 85 having a bore therethrough in which is disposed a fixed sleeve element 74, the latter reciprocably mounting a multiple piston valve structure 70 consisting of spaced cylindrical portions 76 and end abutting reduced portions 77. The sleeve element 74 is provided with a longitudinal series of radially opposed bores 78 which terminate in a similar series of external annular grooves 75 and with a series of alternately arranged annular internal grooves 79, there being one pair of the bores 78, one internal groove 79, and one external groove 75 for each of the pumps 61, 62, 63 and 64.

The several pumps discharge through passages 81 into intake ports or openings 80 formed in the interior surface of housing 85 and thence through grooves 75 and bores 78 in sleeve element 74 to the inner portion of the latter. Sleeve element 74 is further provided with a series of radial ports 82, conforming in number with the pumps and being longitudinally spaced from annular grooves 75, which in connection with grooves 79 afford communication between the inner portion of the sleeve element and passages or ducts 83. These passages 83 lead to a common return manifold 84 terminating in a conduit 86 which communicates with the source of supply 69.

A series of discharge ports 90, one for each pump disposed in radially opposed relation to intake ports 80, place the interior of valve structure 73 in communication with a pressure manifold 88 through a series of passages 87, each containing a check valve structure 89. Thus it is seen that cylindrical valve portions 76 control communication between each of the pumps and the pressure manifold 88 and return manifold 84. And, in this connection, it should be noted that valve portions 76 are designed and arranged to sequentially open and close the bores 78 as the piston valve is reciprocated relative to sleeve element 74. The closing of a bore 78 directs the fluid from the related passage 81 around annular groove 75 to the related passage 87 communicating with pressure manifold 88, and the opening of a bore 78 allows the fluid discharged by the related pump to enter the inner portion of sleeve element 74 and return through annular groove 79, port 82, passage 83, return manifold 84 and passage 86 to the source 69.

Pressure manifold 88 is connected with the cylinder of ram 26 by means of a conduit 91 including a check valve 92. A return fluid conduit 93 also connects a portion of conduit 91 on the ram side of check valve 92 with the interior of valve structure 73 by means of an external annular passage 94 in sleeve element 74 and a pair of radially opposed bores 96. The flow of fluid through bores 96 is also controlled by a piston valve portion which is associated with the like portion controlling the discharge from pump 61. With this arrangement, fluid from the ram enters the inner portion of sleeve element 74 when the associated piston valve is moved to the right sufficiently to open passages 96, and then flows outward therefrom through opposed radial bores 100 in sleeve element 74, annular groove 105, and passage 110, and into return manifold 84.

Manifold 88 is also in communication with return conduit 86 through means of a pressure relief valve structure 97 disposed in a suitable bore 95 in the housing enclosing the pump and control unit 28. Fluid passing through relief valve 97 may enter return conduit 86 upon developing sufficient pressure to move a piston valve 98 toward the right sufficiently to uncover a port 99. A compression spring 101, which is disposed between piston valve 98 and an apertured closure 102 for the adjacent end of bore 95, resists a reopening movement of this valve. Piston valve 98 is provided with a stem portion 103 slidably projecting through closure 102 and has its outer end operatively connected with an arm 104 carried by a lever 106 mounted for pivotal movement about an adjustable support or fulcrum 107 operatively connected with an arm 108 on shaft 33. The lower end of lever 106 has a lost motion connection, pin 109 and slot 111, with a pivotally supported arm 112 which in turn presents a cam surface 113 engaged by a roller 114 mounted on an arm 116 fixed to the shaft 46.

The adjacent end of the multiple cylinder control valve presents a reduced end portion 117 which slidably projects through an apertured closure 118 and abuts a roller 119 positioned on the arm 104 carried by lever 106. The opposite end of the multiple cylinder valve structure presents a reduced portion 121 thereby providing an annular seat 122 which is engaged by one end of a compression spring 123 disposed between this end of the valve structure and a suitable closure 124. Spring 123 acts to maintain the valve sections 76 in end abutting relation to one another and the projection 117 in engagement with roller 119. An adjusting screw 126, threadably received in cover plate 124, is selectively axially positionable to limit the travel of valve 70 toward the left, as viewed in Fig. 4, and thereby the maximum amount of discharge fluid delivered to pressure manifold 88.

Spring 101 is stronger than spring 123 and consequently any movement of lever 34 in a direction tending to shift the upper end of slot 43 away from pin 42 results in a counterclockwise movement of lever 106 about its adjustable fulcrum 107 and thereby a movement of multiple piston control valve 70 towards the left, as viewed in Fig. 4. Such movement results in a sequential closing of the ports 78 and thereby an increase in the number of pumps operating to deliver fluid under pressure to manifold 88. This results in a rapid expansion of ram 26, the rate of expansion depending upon the extent of movement of link 41 and the corresponding extent of movement of the multiple position control valve 70, and a raising of the implement. Conversely, if the draft induced force applied to member 34 should decrease, spring 38, which is aided by spring 123, acts through the control linkage to effect an opposite movement of the multiple piston control valve. This movement, depending upon its extent, will place all pumps in communication with annular grooves 79 and return ports 82 and the ram cylinder in communication with annular groove 94 and return ports 96, whereupon the weight of the implement effects a consequent lowering of the implement to the selected position as determined by the manual setting of adjustable fulcrum 107.

As shown in Fig. 4, the relationship of the various elements of the control unit is such as is effected by shifting manual control lever 29 to its hold position, i. e., all pumps are discharging into return manifold 84 and ram 26 is retained in a selected implement raised position since return bores 96 are closed by the associated piston portion of the valve structure. All that is necessary in order to lower the implement and effect automatic draft regulation is to move manual control lever 29 to a lowering position which acts through link 31 and the arms 32 and 108 on shaft 33 to shift the adjustable fulcrum to the right (see Fig. 4), thereby effecting a pivotal movement of lever 106 in a clockwise direction about its pin and slot connection 109, 111 with arm 112. This immediately results in a follow-up movement of the main control valve, which is caused by the action of spring 123, whereupon return ports 82 are placed in communication with return manifold 84 and the weight of the implement collapses the ram. As soon as the draft induced force transmitted to member 34 increases sufficiently to move link 41 upward, spring 101 pivots lever 106 counterclockwise about its fulcrum 107 and closes return bores 96. If the draft induced force continues to increase, the main control valve moves farther in the same direction, i. e., toward the left, thereby sequentially closing the bores 78 associated with the pumps 61, 62, 63 and 64. This results in the delivery of pressure fluid to the ram and a corrective raising of the implement to a position corresponding to the setting of manual lever 29.

From the foregoing it should be apparent that the vertical position of the implement will be automatically regulated to maintain a uniform draft induced force. The particular pump and control mechanism hereinbefore described forms no part of the present invention and is more fully described and claimed in the copending applications, W. F. Strehlow et al., Serial No. 26,516, filed May 12, 1948, now U. S. Patent 2,611,319, issued September 23, 1952; W. F. Strehlow, Serial No. 27,928, filed May 19, 1948, now U. S. Patent 2,611,245, issued September 23, 1952; W. F. Strehlow, Serial No. 29,234, filed May 26, 1948; W. F. Strehlow et al., Serial No. 30,348, filed June 1, 1948, now U. S. Patent 2,611,306, issued September 23, 1952; and W. F. Strehlow et al., Serial No. 45,084, filed August 23, 1948, now U. S. Patent 2,611,307, issued September 23, 1952.

Figure 5:
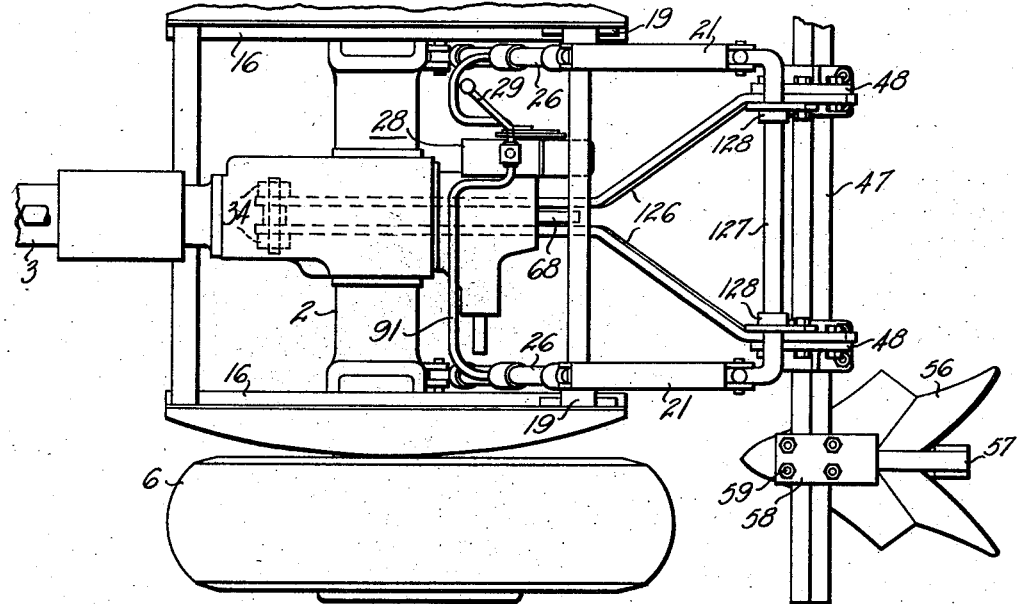
Fig. 5 is a partial plan view showing a tractor implement combination embodying the invention with the implement positioned to the rear of the tractor axle structure.
Figure 6:
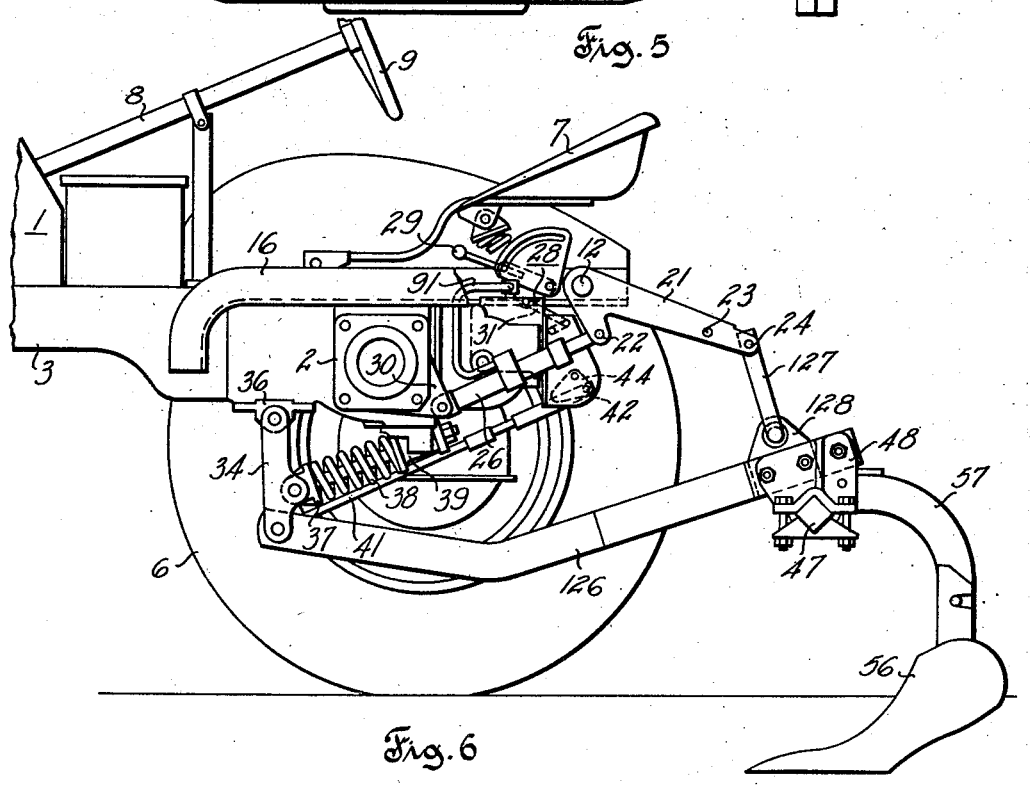
Fig. 6 is a side elevation of the combination shown in Fig. 5 with the near side traction wheel and ground working tool removed in the interest of clarity.

Assuming it is desired to mount the implement in rearwardly disposed relation to rear traction wheels 6 (see Figs. 5 and 6), the apex end of the A-frame portion 53 of the implement is disconnected from depending lever 34, lift links 54 are disconnected from support brackets 48, the rear ends of links 51 are detached from bracket 52, and strap members 49 are disconnected from support brackets 48. When this has been done, A-frame 53 is disconnected from bracket supports 48 and the latter are loosened and turned clockwise 90 degrees relative to tool bar 47 (note Figs. 2 and 6) and then fixedly secured in place.

Links 27, which connect the arm 18 on the front rock shaft 11 with the free ends of the longer arms or lift arms of crank member 21 on rear rock shaft 12, are next removed and the piston rod ends of rams 26 are disconnected from the long arm of bell crank or crank member 21 and reconnected to the short arm thereof at 22. This places the free or link attaching ends of the longer arms of crank members 21 in an implement lifting position rearward of member 34 approximately the same distance as the free ends of lift arms 17 are positioned forward of said member.

Next, an A-frame or reach member 126, which is somewhat similar to and might be made identical to A-frame 53, is rigidly secured to brackets 48 in forwardly extending relation to tool bar 47 and its apex end is operatively connected to pivot lever 34 on the tractor. Next, a lift bail 127, which has its bight portion journaled in a pair of laterally spaced plate members 128 fixedly secured to brackets 48 and is thus pivotally connected to the tool bar, has its leg portions pivotally connected to the pivot pin receiving holes 24 in the lift arms or longer portions of crank members 21.

When thus mounted at the rear of the tractor the implement is subjected to automatic draft regulation in exactly the same manner as previously described with respect to the front mounted position thereof. Consequently it is believed that no further explanation is necessary for a complete understanding as to the automatic draft regulation involved.

Summarizing somewhat, rams 26 are selectively connectable with crank members 21 in one of two positions wherein the free or link attaching ends of the longer portions or lift arms are placed either in a position for direct link operating connection with the actuating arms 18 on rock shaft 11 or in a position such that said free ends are disposed in implement lifting relation rearward of member 34 approximately the same distance as the free ends of lift arms 17 are positioned forward of said member. This enables the use of a common tool bar and attaching brackets, and also the use of an identical draft transmitting A-frame or the like unless it is desired for clearance or other reasons to use a somewhat different frame, as herein shown and described.

From the foregoing it should be evident that apparatus embodying the invention affords an implement construction and lift mechanism permitting an implement to be readily mounted on a tractor either forward or rearward of the rear traction means, as desired, with but a minimum of time, effort and skill. In addition, it should be obvious that an implement embodying the invention presents a simple and compact structure which affords the requisite degree of rigidity when mounted in either position as aforesaid. Furthermore, the construction in question minimizes parts necessary to attain effective automatic draft regulation in either mounted position, thus providing an inexpensive construction having a wide range of utility.

The structure herein shown and described is merely illustrative of a preferred embodiment of the invention and it is to be understood that it is not intended to limit the invention to the exact construction herein shown and described for purposes of illustration, as various modifications within the scope of the appended claims may occur to persons skilled in the art.

It is claimed and desired to secure by Letters Patent:

1. In combination with a tractor having a wide rear axle structure supported on laterally spaced traction means and having a member depending beneath said axle structure between said traction means and supported for limited fore and aft movement in response to variations in draft induced force resulting from forward movement of a tractor attached implement coupled with said member, a first rock shaft operatively mounted on the underside of said tractor to extend laterally outward beyond the opposite sides thereof in advance of said member, a pair of lift arms fixed on opposite end portions of said shaft in forwardly extending relation thereto and in lateral alignment with respect to each other, a pair of actuating arms fixed on said shaft in lateral alignment and in adjacent angularly displaced relation with respect to said lift arms, a second rock shaft operatively mounted on a portion of said tractor rearwardly of said member and in generally parallel relation to said first shaft, a pair of similar parts fixed on said second shaft in lateral alignment and each presenting a pair of angularly displaced arm portions disposed in general alignment longitudinally of the tractor with the adjacent one of said actuating arms, a pair of power transmitting devices operatively associated with said member for simultaneous and like control thereby, said devices each being similarly connected with one of said arm portions and thereby positioning the other of said arm portions in depending relation with respect to said second rock shaft, a pair of similar links operatively connecting the free ends of said other arms with said pair of actuating arms, an elongated tool bar having attaching brackets fixed in laterally spaced relation to a midportion of said bar, said brackets being spaced apart a distance approximately equal to the lateral spacing of said lift arms, means detachably connecting said lift arms and attaching brackets to afford limited fore and aft movement of said bar relative to said lift arms, a frame having laterally spaced end portions pivotally connected with said attaching brackets for relative angular movement about an axis generally parallel to said bar and having its opposite end similarly connected with said member, a pair of levers having their rear ends pivotally mounted on opposite side portions of said tractor in overlying relation to said member, said levers being vertically swingable and extending forwardly above and beyond said tool bar and first rock shaft, and a similar member fixedly extending upward and forward from each of said brackets and having their upper ends pivotally connected with laterally aligned forward portions of said levers.

2. In combination with a tractor having a wide rear axle structure supported on laterally spaced traction means and having a member depending beneath said axle structure between said traction means and supported for limited fore and aft movement in response to variations in draft induced force resulting from forward movement of a tractor attached implement coupled with said member, a rock shaft operatively attached to the underside of said tractor to extend laterally beyond the opposite sides thereof in advance of said member, forwardly extending lift arms fixed on opposite end portions of said shaft, an elongated tool bar having attaching brackets fixed in laterally spaced relation to a midportion of said bar, said brackets being spaced apart a distance approximately equal to the lateral spacing of said lift arms, means detachably connecting said lift arms and attaching brackets to afford limited fore and aft movement of said bar relative to said lift arms, a frame having laterally spaced end portions pivotally connected with said attaching brackets for relative angular movement about an axis generally parallel to said bar and having its opposite end portion similarly connected with said member, a pair of levers having their rear ends pivotally mounted on opposite side portions of said tractor in overlying relation to said member, said levers being vertically swingable and extending forwardly above and beyond said tool bar and rock shaft, and a similar member fixedly extending upward and forward from each of said brackets and having their upper ends pivotally connected with laterally aligned forward portions of said levers.

3. In combination with a tractor having a wide rear axle structure supported on laterally spaced traction means and having a member depending beneath said axle structure between said traction means and supported for limited fore and aft movement in response to variations in draft induced force resulting from forward movement of a tractor attached implement coupled with said member, a rock shaft operatively attached to the underside of said tractor in advance of said member, a lift arm fixed on said shaft in forwardly extending relation thereto, an elongated tool bar having an attaching bracket fixed on said bar, means detachably connecting said lift arm and attaching bracket to afford limited fore and aft movement of said bar relative to said lift arm, a frame having an end portion pivotally connected with said attaching bracket for relative angular movement about an axis generally parallel to said bar and having its opposite end portion similarly connected with said member, a lever having its rear end pivotally mounted on said tractor in overlying relation to said member, said lever being vertically swingable and extending forwardly above and beyond said tool bar and rock shaft, and a member fixedly extending upward and forward from said bracket and having its upper end pivotally connected with the forward end of said lever.

4. In combination with a tractor having a wide rear axle structure supported on laterally spaced traction means and having a control member depending beneath said axle structure between said traction means and supported for limited fore and aft movement in response to variations in draft induced forces resulting from forward movement of a tractor attached implement support coupled with said member, a rock shaft mounted on said tractor to extend transversely thereof, an actuating arm and a lift arm non-rotatably connected with and extending radially from said rock shaft in angularly displaced relation to each other, a servomotor operatively associated with said control member for control thereby and presenting a movable power output element, means operable to detachably secure said power output element selectively to one or the other of said arms, an implement support adjustably mounted on said tractor for up and down movement relative to the latter and connected in draft transmitting relation with said control member, and power transmitting means detachably interposed between said implement support and said lift arm and operable to raise and lower said implement support upon back and forth movement of said rock shaft.

5. In an agricultural machine, the combination set forth in claim 4, wherein said lift arm is of greater effective length than said actuating arm, pivot means cooperable with the free end of said lift arm for connecting said power transmitting means thereto, and other pivot means cooperable with said power output element of said servomotor and connectable selectively either with the free end of said actuating arm or with a portion of said lift arm intermediate the free end of the latter and the axis of said rock shaft.

6. An agricultural machine as set forth in claim 5, wherein said intermediate portion of said lift arm is spaced a greater radial distance from the axis of said rock shaft than said free end of said actuating arm.

7. In combination with a tractor having a wide rear axle structure supported on laterally spaced traction means and having a control member depending beneath said axle structure between said traction means and supported for limited fore and aft movement in response to variations in draft induced forces resulting from forward movement of a tractor attached implement support coupled with said member, a rock shaft mounted on said tractor to extend transversely thereof, an actuating arm and a lift arm non-rotatably connected with and extending radially from said rock shaft in angularly displaced relation to each other, a servomotor operatively associated with said control member for control thereby and presenting a movable power output element, means operable to detachably secure said power output element selectively to one or the other of said arms, a reach member pivotally connected with and extending from said control member, earth engaging tool means mounted on said reach member in spaced relation to said control member for up and down movement with said reach member relative to said tractor, and a link structure detachably interposed between said reach member and said lift arm for raising and lowering said implement support upon back and forth movement of said rock shaft.

8. In combination with a tractor having a wide rear axle structure supported on laterally spaced traction means and having a control member depending beneath said axle structure between said traction means and supported for limited fore and aft movement in response to variations in draft induced forces resulting from forward movement of a tractor attached implement support coupled with said member, a rock shaft mounted on said tractor to extend transversely thereof, an actuating arm and a lift arm non-rotatably connected with and extending radially from said rock shaft in angularly displaced relation to each other, a servomotor operatively associated with said control member for control thereby and presenting a movable power output element, means operable to detachably secure said power output element selectively to one or the other of said arms, a reach member pivotally connected with and extending rearwardly from said control member, earth engaging tool means mounted on a rearward portion of said reach member for up and down movement therewith relative to said tractor, and a link structure pivotally connected with a portion of said reach member rearwardly of said control member and detachably connected to said lift arm.

9. In combination with a tractor having a wide rear axle structure supported on laterally spaced traction means and having a control member depending beneath said axle structure between said traction means and supported for limited fore and aft movement in response to variations in draft induced forces resulting from forward movement of a tractor attached implement support coupled with said control member, a rear rock shaft mounted on said tractor to extend transversely thereof, a rear actuating arm and a rear lift arm nonrotatably connected with and extending radially from said rear rock shaft in angularly displaced relation to each other, a front rock shaft mounted on said tractor in parallel, forwardly spaced relation to said rear rock shaft, a front actuating arm and a front lift arm nonrotatably connected with and extending radially from said front rock shaft in angularly displaced relation to each other, a link operatively interposed between said rear lift arm and said front actuating arm, a servomotor operatively associated with said control member for control thereby and presenting a movable power output element, means operable to detachably secure said power output element selectively to one or the other of said rear actuating and lift arms, an implement support adjustably mounted on said tractor for up and down movement relative to the latter and connected in draft transmitting relation with said control member, and a lift link operatively interposed between said front lift arm and said implement support for raising and lowering the latter upon back and forth movement of said rear rock shaft.

References Cited in the file of this patent
UNITED STATES PATENTS

| Number | Name | Date |
|---|---|---|
| 2,295,898 | Hollis | Sept. 15, 1942 |
| 2,394,210 | Sherman | Feb. 5, 1946 |
| 2,466,555 | Paine et al. | Apr. 5, 1949 |